(12) United States Patent
Ryer et al.

(10) Patent No.: US 10,491,968 B2
(45) Date of Patent: Nov. 26, 2019

(54) TIME-BASED VIDEO METADATA SYSTEM

(75) Inventors: Mat Ryer, London (GB); Phil Jackson, Boulder, CO (US)

(73) Assignee: ECO DIGITAL, LLC, Alpharetta, GA (US)

(*) Notice: Subject to any disclaimer, the term of this patent is extended or adjusted under 35 U.S.C. 154(b) by 838 days.

(21) Appl. No.: 13/283,100

(22) Filed: Oct. 27, 2011

(65) Prior Publication Data

US 2013/0108239 A1    May 2, 2013

(51) Int. Cl.
*H04N 21/84*    (2011.01)

(52) U.S. Cl.
CPC .................................. *H04N 21/84* (2013.01)

(58) Field of Classification Search
CPC ....................................................... H04N 21/84
USPC ......................................................... 386/241
See application file for complete search history.

(56) References Cited

U.S. PATENT DOCUMENTS

| | | | |
|---|---|---|---|
| 2005/0013590 A1* | 1/2005 | Ando et al. | 386/95 |
| 2007/0250863 A1 | 10/2007 | Ferguson | |
| 2009/0138906 A1 | 5/2009 | Eide et al. | |
| 2009/0276817 A1* | 11/2009 | Colter et al. | 725/88 |
| 2011/0161409 A1 | 1/2011 | Nair et al. | |

OTHER PUBLICATIONS

Young, Lee W., "International Search Report and Written Opinion re Application No. PCT/US12/71571", dated Mar. 26, 2013, p. 10, Published in: US.
Baharlou, Simin, "International Preliminary Report on Patentability re Application No. PCT/US2012/071571", dated May 8, 2014, p. 7, Published in: CH.

* cited by examiner

*Primary Examiner* — William C Vaughn, Jr.
*Assistant Examiner* — Daniel T Tekle
(74) *Attorney, Agent, or Firm* — Moore & Van Allen PLLC; Peter B. Stewart

(57) ABSTRACT

A video display device comprising a video source and a video playback mechanism. The video source comprises a plurality of time-based metadata. The video playback mechanism uses at least one of the plurality of time-based metadata to display at least one of the video source, and one or more menu options.

23 Claims, 11 Drawing Sheets

TIME-BASED VIDEO METADATA SYSTEM

FIELD OF THE INVENTION

Aspects of the present invention relate to video display systems. In particular, but not by way of limitation, the present inventions relates to using time-based video metadata to play video clips.

BACKGROUND OF THE INVENTION

At times, prior to watching a video, or during the time a video is being viewed, it is desired to view one or more specific sections of the video. Additionally, it may be desired to follow-up with one or more items displayed in the video when the video is complete. For example, it may be desirable to view portions of the video showing a specific person in the video or it may be desirable to view video clips of all spots in the video showing a certain event which occurs in the video. Furthermore, a user may wish to learn more background information about a topic briefly mentioned in the video. In order to perform such actions, it may be necessary to view the entire video, and while viewing the video, note when such persons or events are present in the video or write down topics mentioned in the video. After watching the entire video, a user may manually edit the video so that the user may view the clips containing the events or persons the user wishes to view, and may then seek additional information on the topics mentioned in the video.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Instead of manually "cutting and pasting" one or more portions of a video into a "highlight reel" of events, objects, and/or persons in the video desired to be viewed, in one embodiment, a video display device has been developed. One video display device comprises a video source comprising a plurality of time-based metadata and a video playback mechanism using at least one of the plurality of time-based metadata to display at least one at least a portion of the video source, and one or more menu options.

Another embodiment of the invention comprises a method of displaying one or more videos. One method comprises choosing at least one video source comprising time-based metadata, identifying in the at least one video source at least one of one or more objects, one or more events, and one or more persons. The method further comprises reviewing the time-based metadata in the video source. The method may still further comprise displaying one or more sections of the video source comprising the at least one of, one or more objects, one or more events, and one or more persons.

Yet another embodiment of the invention may be characterized as a video display system. One video system comprises a digital video source comprising a plurality of time-based metadata related to a video source content. The system further comprises a network device adapted to provide at least a portion of the video source based on at least one starting timestamp of the time-based metadata and at least one ending timestamp of the time-based metadata. The video system still further comprises a video display device adapted to receive the at least a portion of the video source and display the at least a portion of the video source.

BRIEF DESCRIPTION ON THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

DETAILED DESCRIPTION

Figure 1:
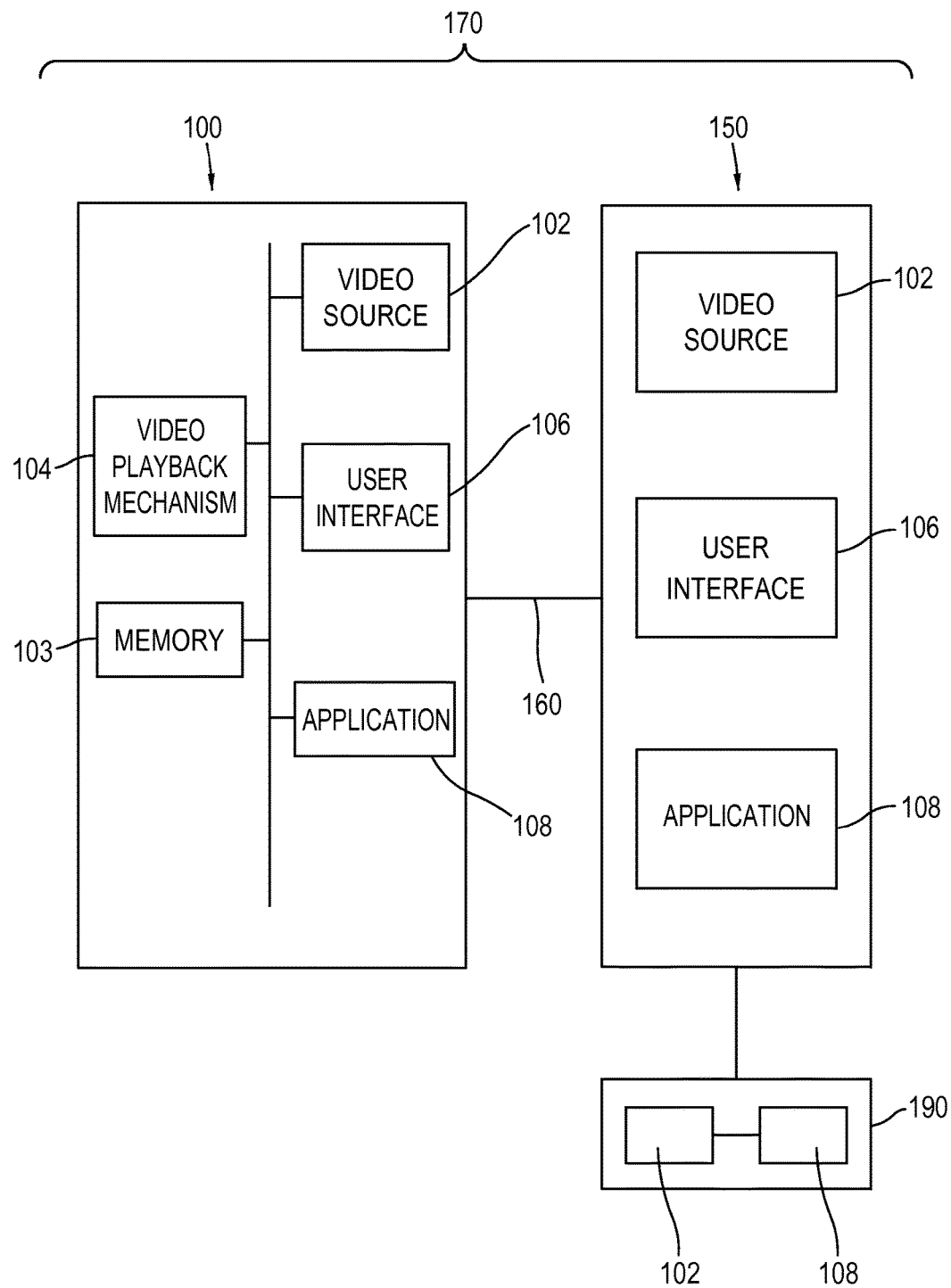
FIG. 1 illustrates a block diagram depicting physical components of a video display system comprising a video display device, a network device, and a time-based metadata input device of an exemplary embodiment of the present invention.

Turning first to FIG. 1, seen is a video display system 170 comprising one video display device 100. Multiple video display devices 100 are contemplated. As seen, the video display device 100 in FIG. 1 may comprise a video source 102 and a video playback mechanism 104. The video source 102 may be stored in a video display device memory 103. The video playback mechanism 104 may comprise a video player. In one embodiment, the video source 102 may comprise a digital file such as, but not limited to, an mpeg file. Throughout the specification, the term video source 102 may also be referred to as video, where appropriate. The digital file comprising the video source 102 may also comprise metadata. Each metadata item may be associated with one or more timestamps. The specification may also refer to the term metadata as a plurality of time-based metadata or time-based metadata.

Figure 2:
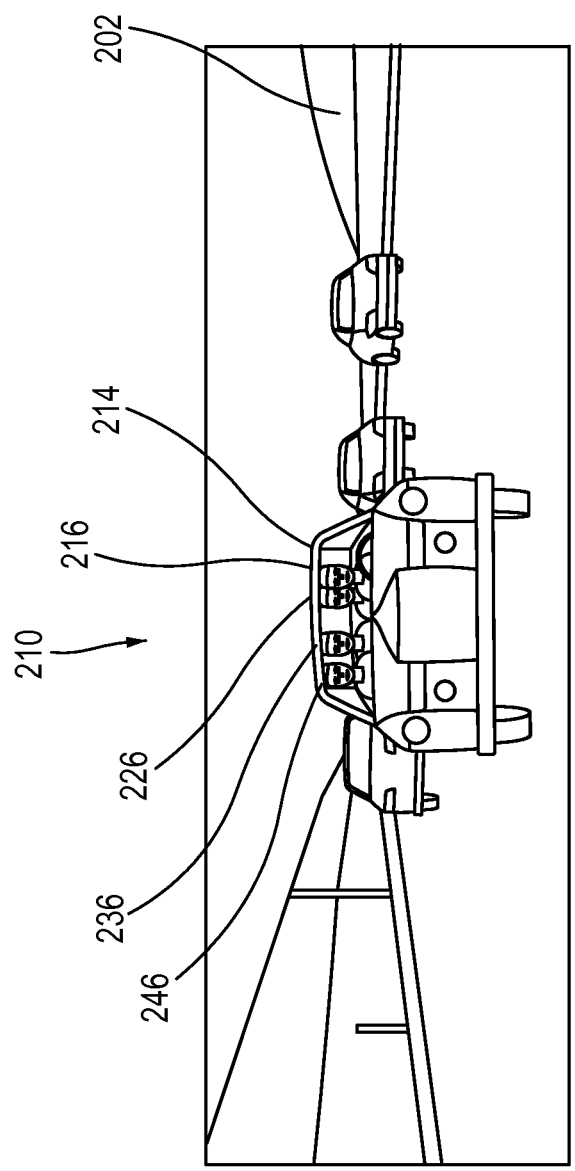
FIG. 2 illustrates a video display of an exemplary embodiment of the present invention.

In one embodiment, the video playback mechanism 104 comprises an electronic display and may use at least one of the plurality of time-based metadata to display at least a portion of the video source 102 in the electronic display. For example, seen in FIG. 2 is an electronic display 210 of one scene of a video source 202 comprising a movie. The movie scene in FIG. 2 comprises a car 214, actor A 216, actor B 226, actor C 236, and actor D 246. The FIG. 2 scene may begin at a 10:00 timestamp of the video. The video may fail to display each of the car 214, actor A 216, actor B 226, actor C 236, and actor D 246 at an 11:00 timestamp in the video. In such an example, a plurality of time-based metadata for the FIG. 2 scene may be associated with timestamps at the 10:00 and 11:00 of the digital file. Such metadata may provide information that each of the car 214, actor A 216, actor B 226, actor C 236, and actor D 246 is displayed in the scene starting at the 10:00 timestamp, while the 11:00 minute timestamp may show that each of the car 214, actor A 216, actor B 226, actor C 236, and actor D 246 is no longer displayed in the scene.

Returning now to FIG. 1, in one embodiment, a user may manually choose to view the video source 102, or, the video source 102 metadata may be automatically reviewed or accessed. For example, an application 108 may use the video playback mechanism 104 to automatically access the video source 102, or the video source 102 may be accessed by a script, or other program. As seen, the application 108 may reside on the video display device 100, and may comprise an internet browser. In one embodiment, the user may manually choose to view portions of the video source 102 comprising a specific topic such as, but not limited to, actor A.

In one embodiment, the plurality of time-based metadata accessed either manually or automatically to enable a user to view sections of the video may be manually placed into the digital file. In the FIG. 2 example, data comprising the video source 202 may be manually modified to enable placement of metadata identifying that each of the car 214, actor A 216, actor B 226, actor C 236, and actor D 246 are displayed from the 10:00 mark to the 11:00 mark. Alternatively, at least a portion of the time-based metadata may be automatically placed in the digital file. For example, facial recognition software may be used to determine when actor A 216, actor B 226, actor C 236, and/or actor D 246 enter and/or leave a scene. A combination of manual and automatic introduction of the time-based metadata into the digital file is also contemplated.

Figure 3A:
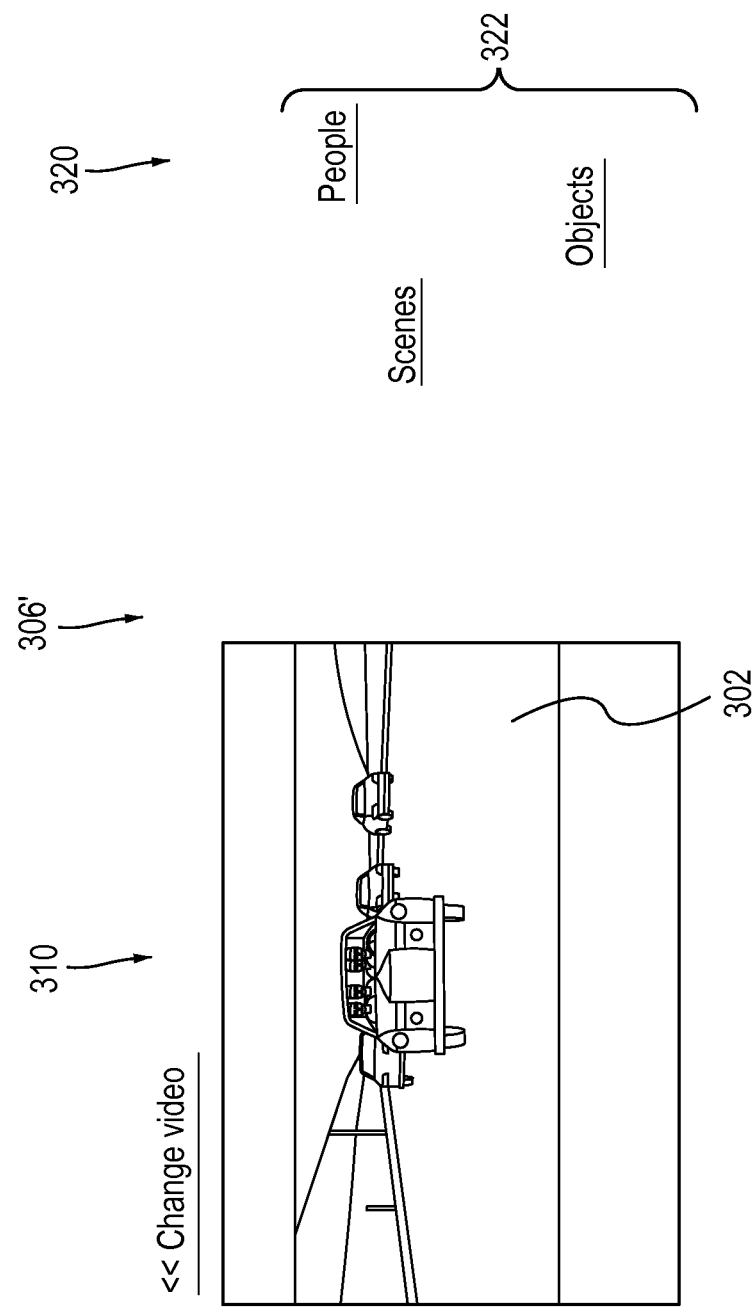
FIG. 3A illustrates a video display and a first level of one or more menu options of a first user interface of an exemplary embodiment of the present invention.

Returning again to FIG. 1, in one embodiment, the video playback mechanism 104 may implement a user interface 106 to display the video, upon a video source 102 being chosen by a user. Seen in FIG. 3A is one example of a first user interface 306'. One embodiment of a first user interface 306' may comprise (i) a display 310 of a chosen video source 302, and (ii) one or more menu options 320. The one or more menu options 320 may correspond to at least a portion of the time-based metadata in the video source 302. For example, upon choosing the video to display, the user interface 106 or other portion of the video display device 100 may access the metadata, with the metadata providing the one or more menu options 320 to display. The time-based metadata may also be accessed upon selecting one of the one or more menu options 320. For example, upon selecting one of the one or more menu options 320, the metadata may be accessed and one or more additional menu options may be displayed and/or one or more sections of the video may be displayed, depending on the information in the metadata.

Seen in FIG. 3A are three menu options—scenes, people, and objects, comprising a first level 322 of the one or more menu options 320 that may be displayed upon accessing at least a portion of the time-based metadata of the video source 302. Other menu options are contemplated, depending on the type of video source chosen (entertainment, sports, news, or otherwise) and depending on the type of user, network, and/or device used to access the video. For example, there may be restrictions placed for certain menu options for underage users, or certain options may only exist for networks/devices that offer certain services (e.g., 3-D video). It is contemplated that one or more menu options 320 may be(i) obtained from the time-based metadata and (ii) related to information in the video source. For example, the time-based metadata may comprise information about one or more objects in the video source and may therefore present one or more menu options 320 related to the one or more objects. Alternatively, the time-based metadata may be related to one or more events occurring in the video source and/or one or more persons in the video source and therefore the one or more menu options 320 may be related to the one or more events and/or the one or more persons. The time-based metadata may also be related to a starting timestamp and an ending timestamp for each of the one or more objects, one or more events and one or more persons.

Figure 3B:
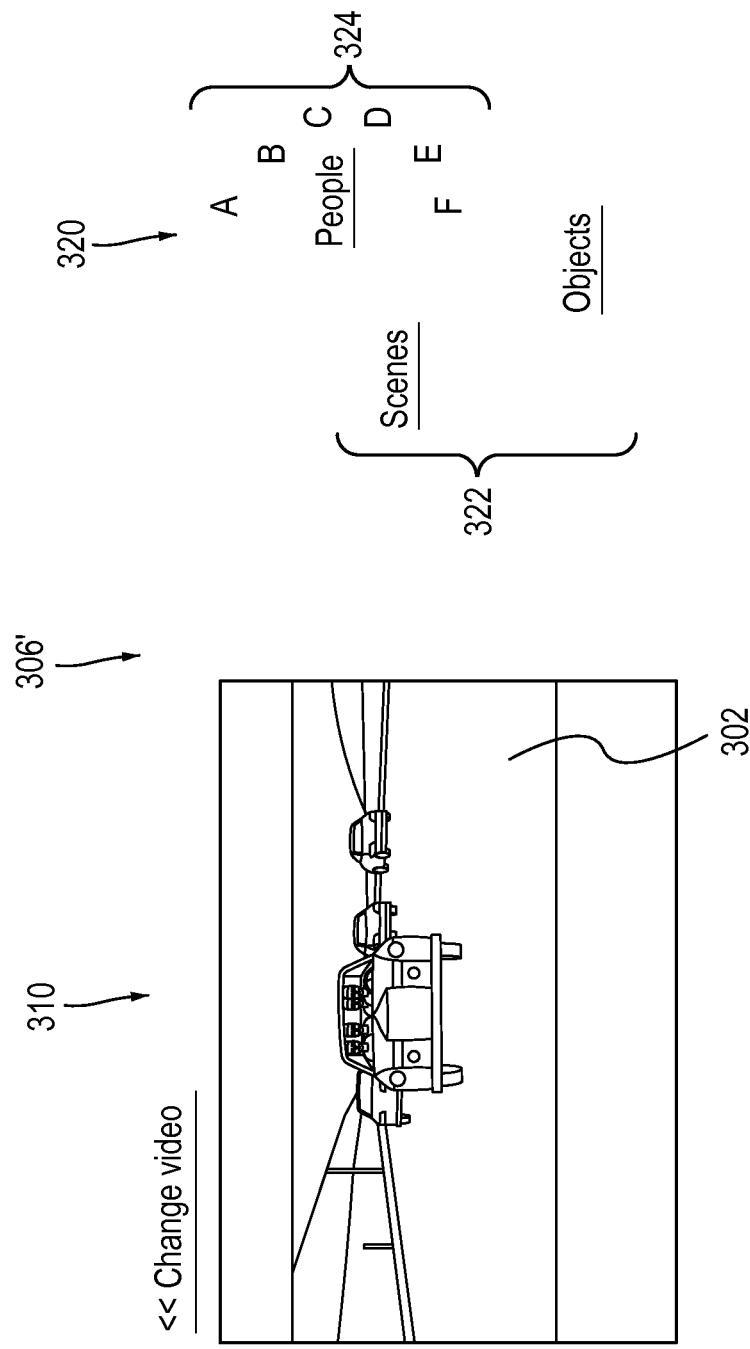
FIG. 3B illustrates a video display and a first and second level of one or more menu options of a first user interface of an exemplary embodiment of the present invention.
Figure 3C:
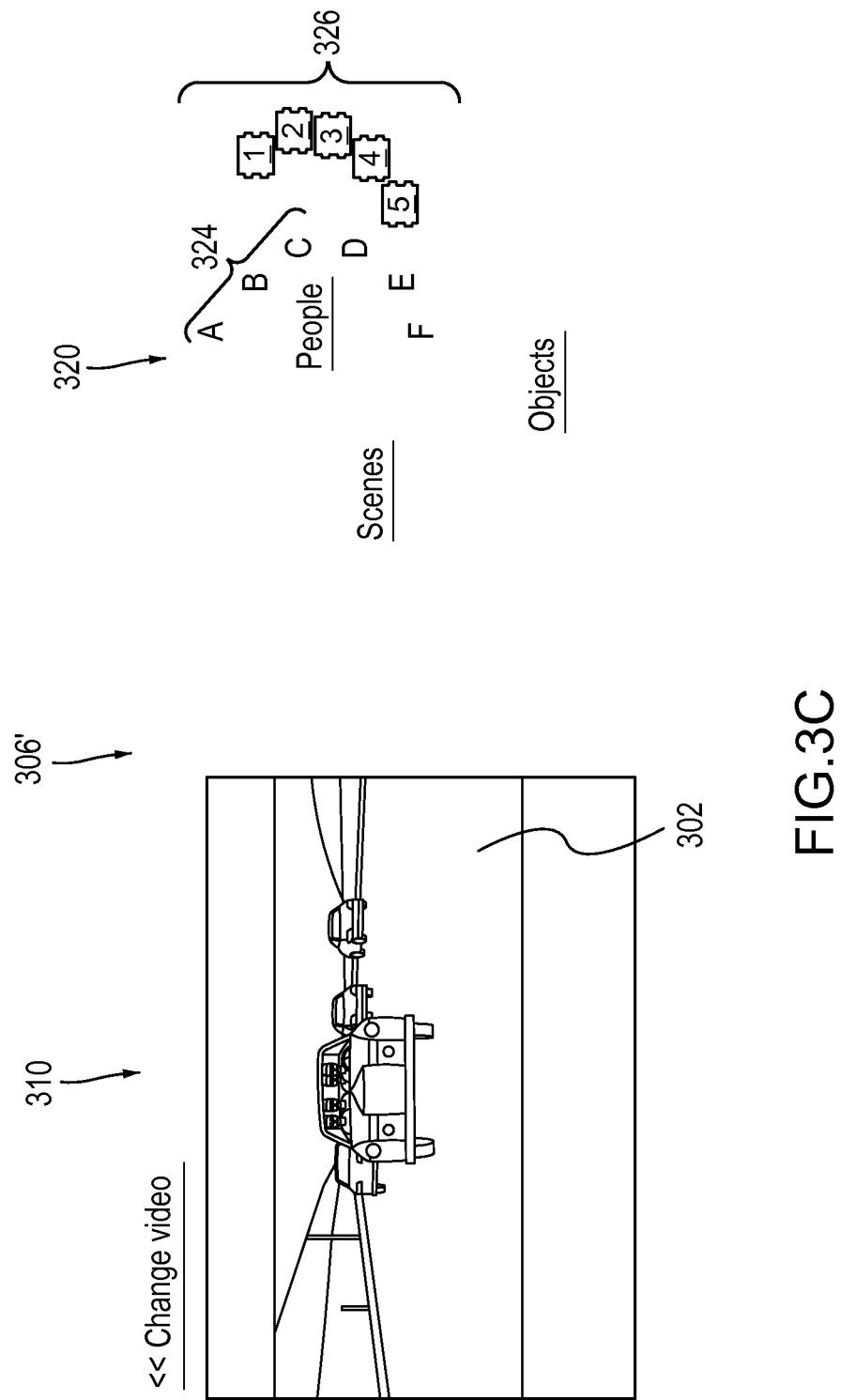
FIG. 3C illustrates a video display and a first, second and third level of one or more menu options of a first user interface of an exemplary embodiment of the present invention.

As seen in FIG. 3B, upon selecting at least one of the first level 322 of the one or more menu options 320, one or more additional menu options such as, but not limited to, at least one second level 324 menu options may be displayed. The at least one second level 324 menu options may correspond to metadata associated with the selected first level 322 menu option(s). For example, as seen in FIG. 3B, when the "People" first-level 322 menu option has been chosen, displayed as the second level 324 menu options are a list of actors A-F, who may be shown at some point in the video source 302. As seen in FIG. 3C, upon choosing one of the second-level 324 menu options, displayed are one or more third-level 326 menu options. For example, in FIG. 3C, actor C may be chosen and displayed as the one or more third-level 326 menu options are scenes one through five, which may be the five scenes that actor C is shown in the video source 302. In other embodiments, additional menu layers are contemplated and/or other menu option levels may comprise one or more video clips. In one embodiment, the second level 322 menu options may be referred to as a first additional menu option and the third level 324 menu option may be referred to as a second additional menu option, etc.

As discussed, the video display device 100 may use the time-based metadata to display each level of the one or more menu options 320. For example, upon selecting the video source 302 to view, the time-based metadata of the video source 302 may be accessed and the first level 322 menu options may be provided to display in the first user interface 306'. In a similar manner, each additional level of the one or more menu options 320 may also be displayed by accessing the metadata to determine the menu choices to display.

Upon reaching a level of the one or more menu options 320 that displays a video clip to access, for example, the third level 326 menu options numbering one through five as seen in FIG. 3C, upon choosing at least one of the menu options, the display 320 may begin to play the selected video clip. It is also contemplated that a user may select more than one of at least one level of the one or more menu options 320. For example, the user may select two of the second level 324 menu options and a third level 326 menu option may be displayed based on the selections. Two or more video clips may also be chosen to be viewed. For each level of the one or more menu options 320, the information to display may be taken from the time-based metadata and each successive menu layer may relate to at least one previous layer and may relate to all previous menu option layers.

Figure 4A:
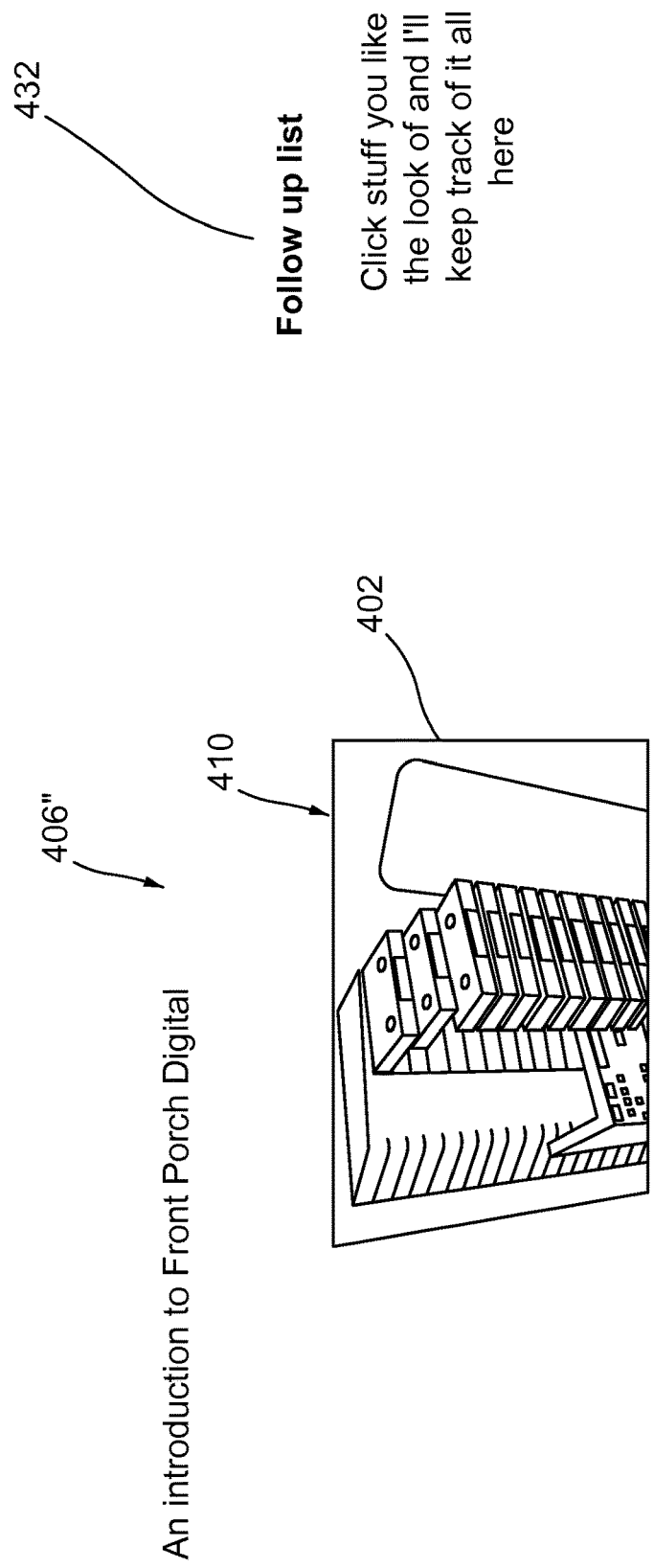
FIG. 4A illustrates one initial display of a second user interface of an exemplary embodiment of the present invention.
Figure 4B:
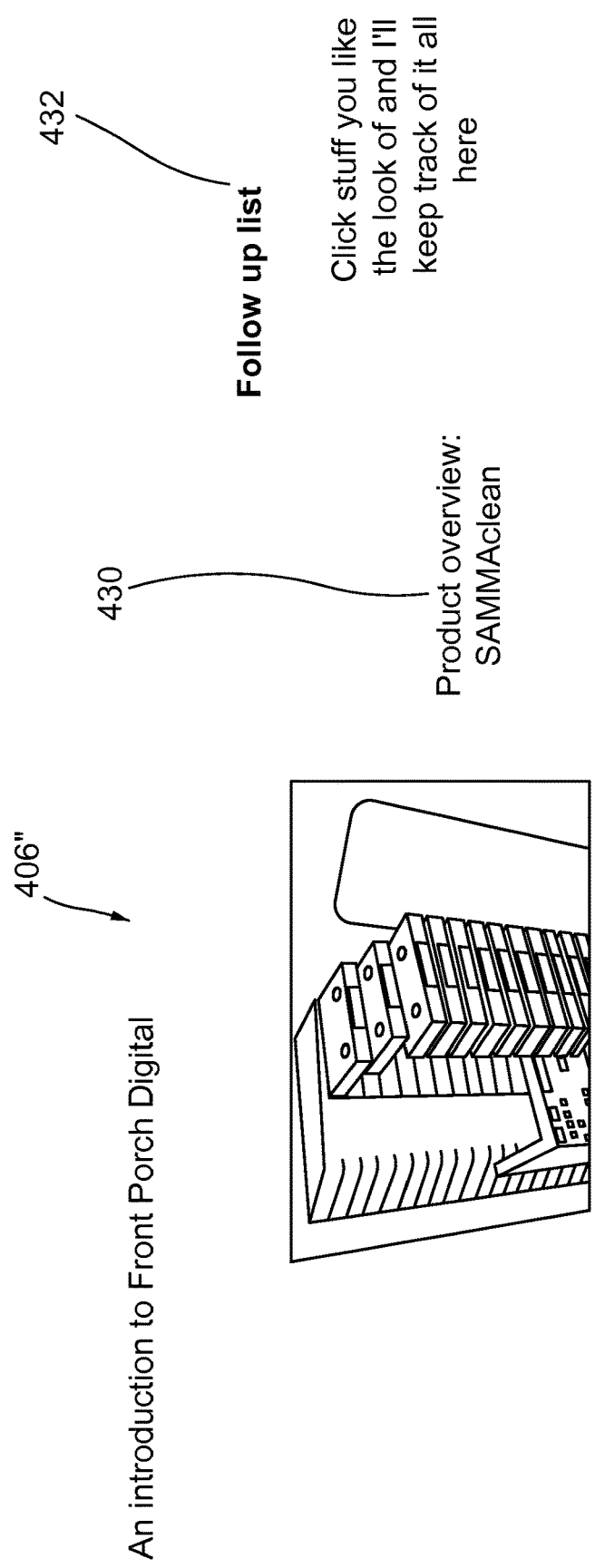
FIG. 4B illustrates a first related content menu item of a second user interface of an exemplary embodiment of the present invention.
Figure 4C:
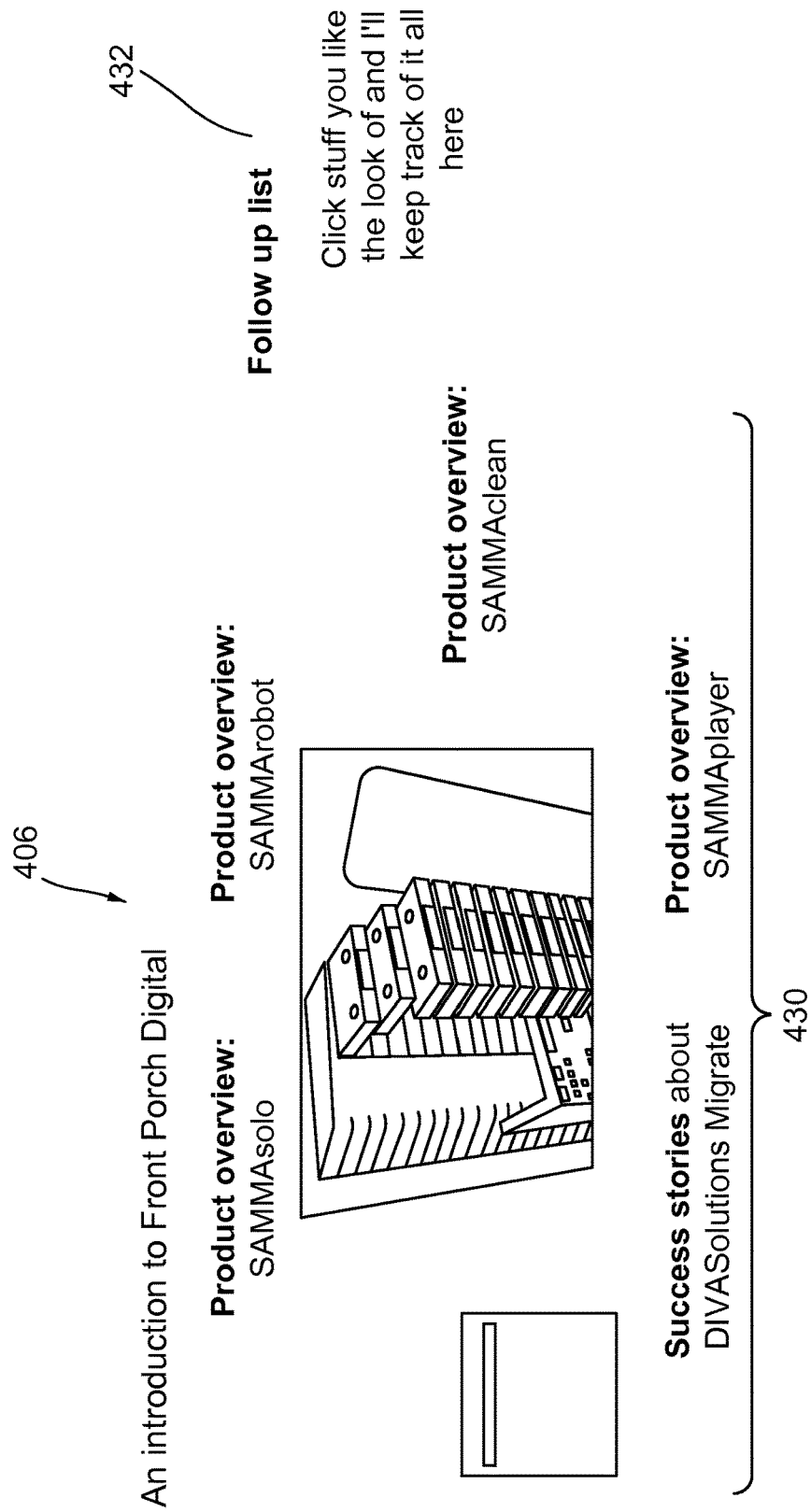
FIG. 4C illustrates additional related content menu items of a second user interface of an exemplary embodiment of the present invention.
Figure 4D:
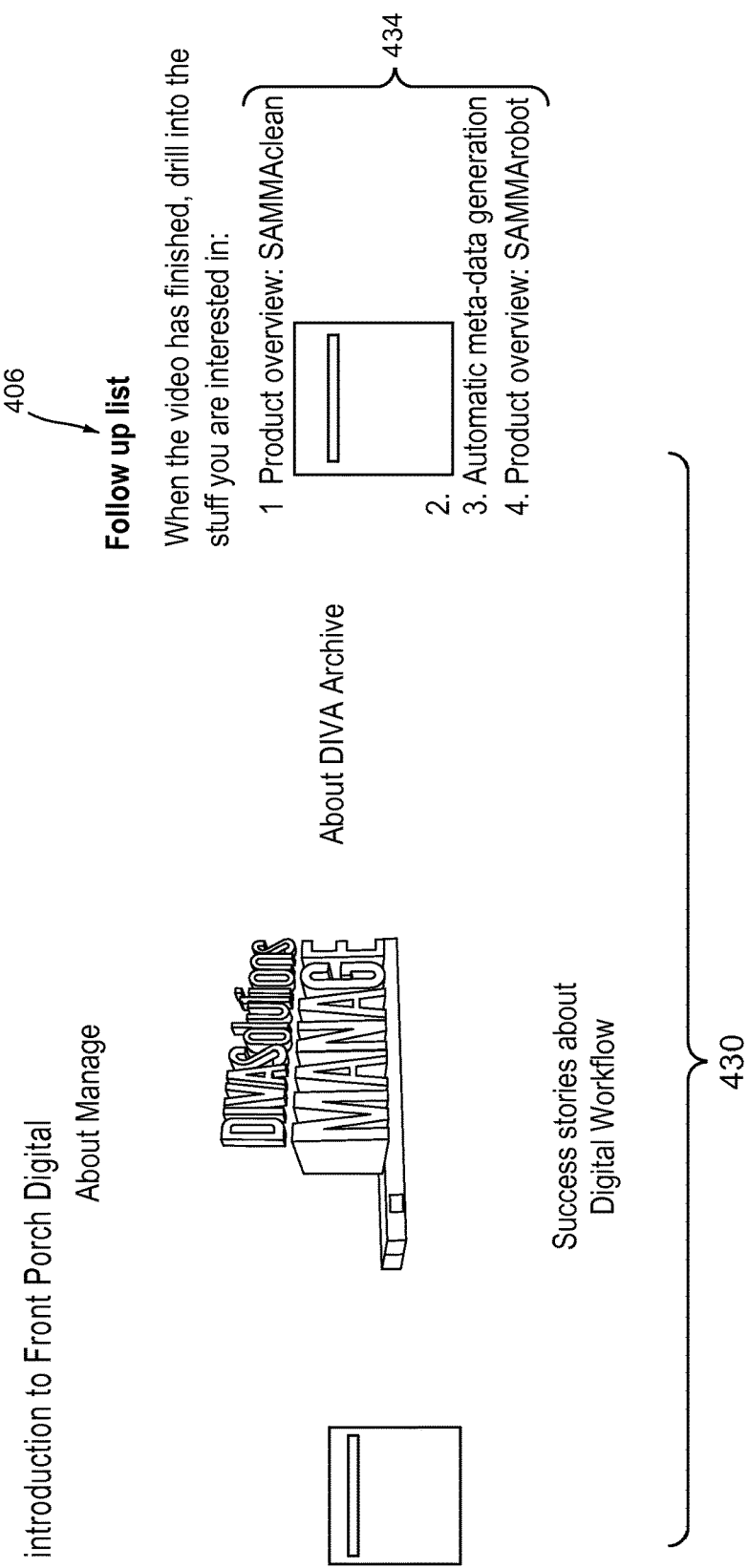
FIG. 4D illustrates a second user interface of an exemplary embodiment of the present invention.

Turning now to FIG. 4A, seen is one initial display of a second user interface 406". The second user interface 406" may be used in conjunction with at least a portion of the first user interface 306' and/or any other interface 106, or may be used by itself. Like the first user interface 306', the second user interface 406" comprises an electronic display 410 of a video source 402 upon a video source 402 being selected. However, the initial display of the second user interface 406" may not initially comprise the first level menu options 322 seen in FIG. 3. Seen in FIG. 4B as the video begins to play in the display 410 are one or more related content menu items 430. For example, the video may discuss a topic such as, but not limited to, an overview of the Front Porch Digital® product SAMMA clean. When this topic is encountered in the video, the second user interface 406" may also encounter time-based metadata adapted to display the one or more related content menu items 430 related to the topic. As seen in FIG. 4C, additional related content menu items 430 may be displayed by the user interface 406 when the topic and associated time-based metadata are encountered in the video. Also seen in FIGS. 4A-4C is a follow-up list 432. Upon display of the one or more related content menu items 430, a user may select at least one of the one or more related content menu items 430 and the selected one or more related content menu items 430 may be saved and displayed in the follow-up list 432, as seen in FIG. 4D as selected content 434. Each of the selected content 434 may comprise a link adapted to provide additional information to the user on that topic.

Figure 5:
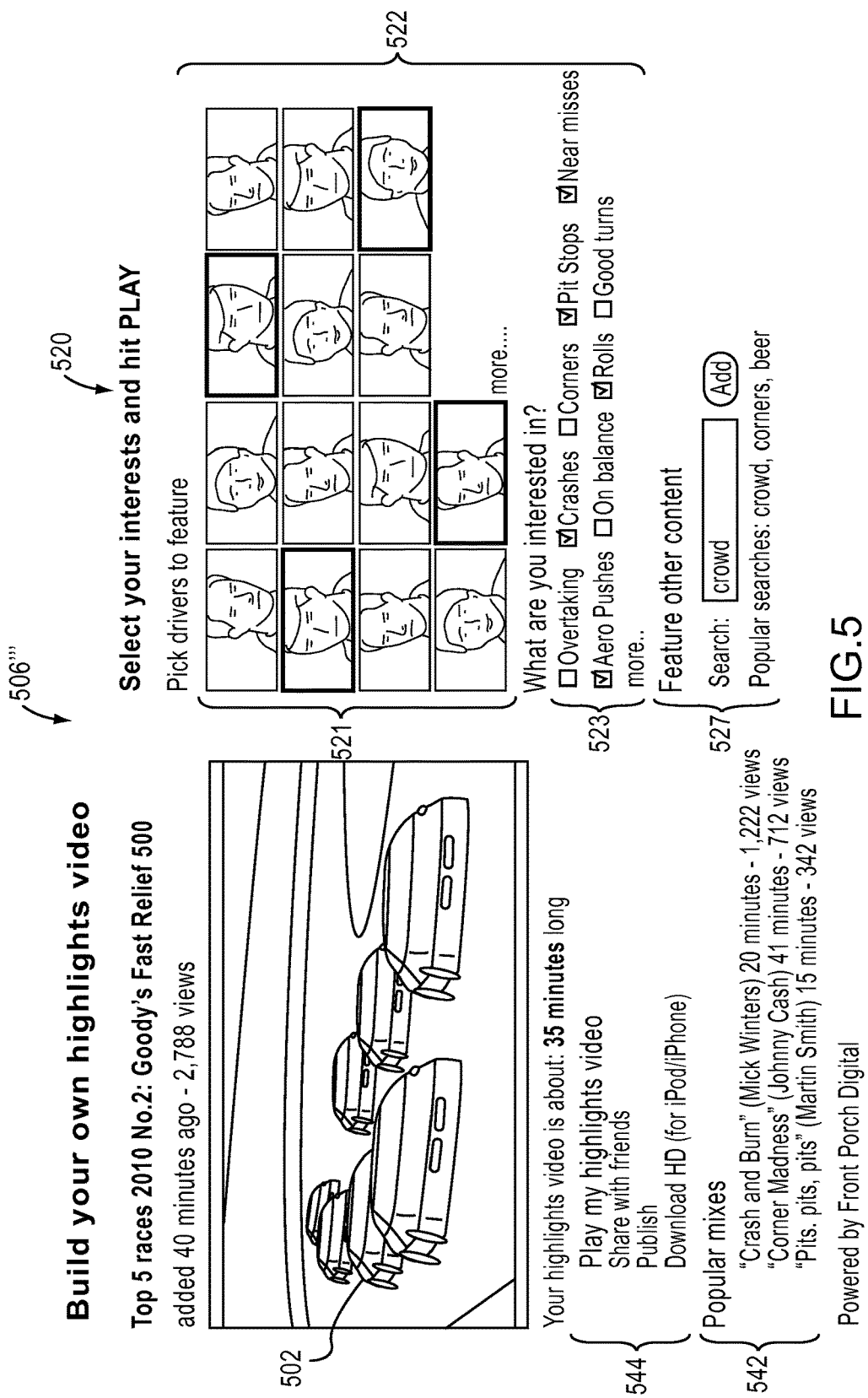
FIG. 5 illustrates a third user interface of an exemplary embodiment of the present invention.

Turning now to FIG. 5, seen is one example of a third user interface 506'". One third user interface 506'" may enable a user to create a compilation video from a video source 502. It is also contemplated that more than one video source 502 may be used to create the compilation video. Compilation videos may also be automatically created via a script or otherwise. Similar to the first user interface 306', the third user interface 506'" may comprise one or more menu options 520. However, the one or more menu options 520 in the third user interface 506'" may all comprise first level menu options 522. For example, instead of initially choosing a first level menu option 322 and then choosing a corresponding second level menu option 324 and any other additional level menu options as see in FIGS. 3A and 3B to display the third level menu options 326 which may each comprise a video clip, the third user interface 506'" may display any additional menu options as a first level menu option 522.

See in FIG. 5 are first level menu options 522 for a video source 502 comprising a car race. As seen, the first level menu options 522 for selection by a user may comprise drivers 521 and car maneuvers 523 such as, but not limited to, overtaking, crashes, corners, pit stops, near misses, aero pushes, on balance, rolls and good turns. Other menu options are contemplated. The user interface 506'" may further comprise a search feature 527 which may list recent, or popular searches. In addition, the third user interface 506'" may comprise additional features such as, but not limited to, a popular compilation section 542 which lists recent compilation videos frequently accessed by the user or other users, and an access compilation section 544 which may enable a user to play, share, or download the compilation. It is contemplated that any feature in one of the first user interface 306', second user interface 406", and third user interface 506'" may be found in any of the other of the first user interface 306', second user interface 406" and third user interface 506'".

Returning now to FIG. 1, seen in the video display system 170 is a network device 150. One network device 150 may store one or more video source 102 files and provide the one or more video source 102 files to the video display device 100 through a network connection 160, which may comprise either a wired or wireless network connection 160. The video display device 100 may use both one or more locally-stored video source 102 and one or more network-device-stored video source 102. It is also contemplated that one or more portions of the first user interface 306', second user interface 406", and third user interface 506'" may also be provided to the video display device 100 from the network device 150. For example, the video display device 100 may comprise an application 108 adapted to connect to the network device 150, search the metadata video source 102 located on the on a network device 150, and provide one or more menu options 320 to the user interface 106 from the network device 150. Furthermore, at least a portion of the user interface 106 or other video system 170 components may be provided to the video display device 100 as part of a cloud-based service.

Figure 6:
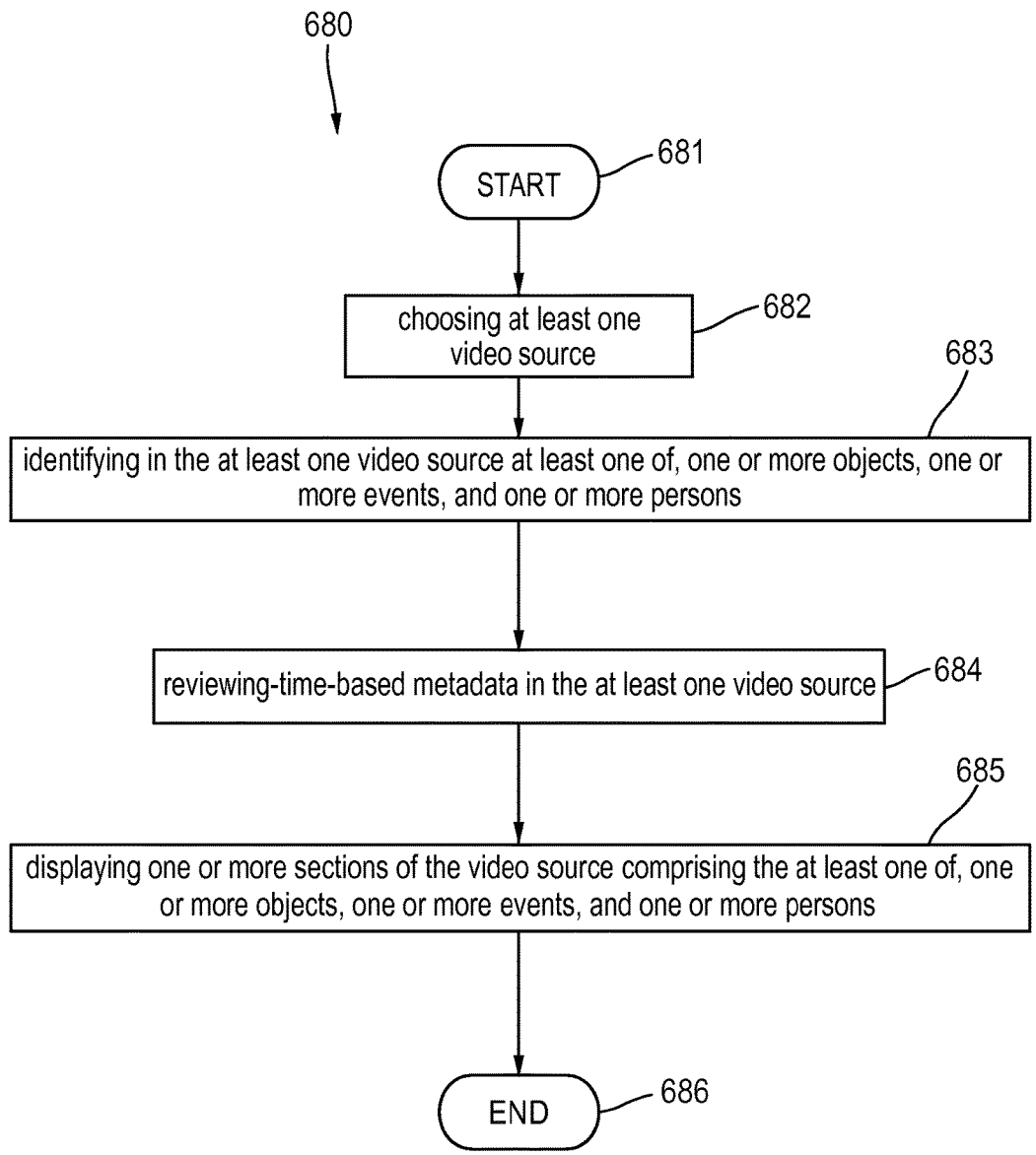
FIG. 6 depicts a flowchart that may be carried out in connection with the embodiments described herein.

Turning now to FIG. 6, seen is a method 680 of displaying at least a portion of one or more videos. The method starts at 681 and at 682 comprises choosing at least one video source such as, at least one video source 102 on the video display device 100 seen in FIG. 1. The video source 102 may be chosen automatically by an application 108 or the video source 102 may be manually chosen by a user. A plurality of video sources 102 may also be chosen. At 683, the method 680 comprises identifying in the at least one video source 102 at least one of one or more objects, one or more events, and one or more persons. For example, this may be done by using the time-based metadata that has been inserted into the video source 102 to determine when the one or more objects, one or more events, and one or more persons are displayed in the video source 102. In one embodiment, one or more applications 108 may be adapted to review the video source 102 for the time-based metadata and may provide information from the metadata to a video playback mechanism 104 which may comprise a user interface 106. Although shown as separate from the video playback mechanism 104 in FIG. 1, at least a portion of the one or more applications 108 may comprise at least a portion of the video playback mechanism 106. At 684 the method 680 comprises reviewing time-based metadata in the at least one video source 102. For example, the information obtained from identifying at least one of one or more objects, one or more events, and/or one or more persons may comprise a start time and an end time that the one or more objects, one or more events, and one or more persons are located in the video source 102. Upon receiving the time-based metadata, at 685, the method 680 comprises displaying one or more sections of the video source 102 with the video display device 100, the one or more sections comprising at least one of one or more objects, one or more events, and one or more persons. In one embodiment, displaying one or more sections of the video source 102 may comprise (i) first displaying an object such as, but not limited to, an image comprising a link to one or more sections of the video source 102, as seen by the third level 326 menu options in FIG. 3C, before (ii) the video is displayed through clicking on the object, accessing the video through the link. The method 680 ends at 686.

As disclosed with reference to FIGS. 3A-3C and FIG. 5, identifying in the video source 302, 502 at least one of one or more objects, one or more events, and one or more persons may comprise choosing one or more menu options 320, 520. Based on the selection of the one or more menu options 320, 520, the time-based metadata in the one or more video sources 302, 502 may be reviewed to determine when the selected one or more menu options 320, 520 is present in the video. In reviewing the time-based metadata, a starting timestamp and an ending timestamp for the one or more sections of the video source 320, 520 comprising the selected at least one of one or more objects, one or more events, and one or more persons is determined. Furthermore, the one or more sections of the video source comprising the selected at least one of one or more objects, one or more events, and one or more persons may then be displayed beginning at the starting timestamp of a first video section and ending at the ending timestamp of a last video section. Alternatively, the user may choose to view a plurality of video sections successively.

The one or more first menu options 322 522 may comprise a first list of at least one of one or more objects, one or more events, and one or more persons present in the video source 302, 502. It is contemplated that in one embodiment, the one or more menu options 320 520 may be displayed without accessing and/or receiving information from the time-based metadata. For example, various menu options may be displayed through a display of a web page comprising an HTML script or otherwise. Upon accessing a menu level of the one or more menu options 320, 520 that produces one or more video clips to view—for example, upon selecting a menu option from the second level 324 menu options, the time-based metadata may then be reviewed to determine which video clips—such as the third level 326 menu options to display. It is contemplated that throughout the application, where the one or more menu options 320, 520 are described, the one or more related content menu items 430 may be used in place of the one or more menu options 320, 520 or one or more first menu options 322, 522 or second level 324 menu options. Therefore, selecting at least one of the one or more objects, one or more events, and one or more persons from a menu comprising a list which may comprise a first list of the at least one of the one or more objects, one or more events, and one or more persons may occur prior to reviewing time-based metadata in the video source. Additionally, displaying and selecting an item from a menu comprising a displayed second list after selecting at least one of the one or more objects, one or more events, and one or more persons from the first list, may occur prior to the displaying one or more sections of the video source. For example, selecting a second level 324 menu option may occur before selecting the one or more third menu 326 options to display at least a portion of a video.

As also described elsewhere in the specification, in the second user interface 406" seen in FIGS. 4A-4D, the video source 402 may be displayed substantially simultaneously as reviewing the time-based metadata associated with the displayed video source 402 portion. For example, the one or more related content menu items 430 may be displayed upon encountering in the video source 402 metadata referencing the one or more related content menu items 430 when the video source is displaying similar content. The one or more related content menu items 430 may also be referred to as one or more real-time menu options, and as described, the one or more real-time menu options may correspond to one or more objects, one or more events, or one or more persons displayed in the video source 402 at substantially the same time as the one or more related content menu items 430 is displayed.

Returning to FIG. 1 seen is the video display system 170 comprising the video source 102, which in one embodiment comprises a digital video source comprising a plurality of time-based metadata. The system 170 further comprises a network device 150 adapted to provide at least a portion of the video source 102 to the video display device 100, where at least a portion of the video source provided to the video display device 100 may be based on at least one starting timestamp of the time-based metadata, and one ending timestamp of the time-based metadata. For example, the video display device 100 is adapted to request the at least a portion of the video source 102 based on the starting timestamp of the time-based metadata and the ending timestamp of the time-based metadata—such as, but not limited to, by choosing through a user interface 106 one or more objects, persons, or events, to view in one or more videos. It is contemplated that one system may be adapted to receive a menu selection of a person/event/object by a user clicking on a the person/event/object in the video as the video is being displayed. The user interface 106 may then access the time-based metadata to obtain the proper timestamps for the video portions comprising the selected options. The video display device 100 is also adapted to display at least a portion of the video source 102 based on the at least one starting timestamp of the time-based metadata and the at least one ending timestamp of the time-based metadata. It is contemplated that the portion of the video source 102 based on the at least one starting timestamp of the time-based metadata and the at least one ending timestamp of the time-based metadata may comprise multiple portions of the video source, each portion having a starting timestamp and ending timestamp.

The network device 150 user interface 106 may also comprise one or more menu items 320, 520 related to video source content. As discussed in FIGS. 3A-3C and FIG. 5, the one or more menu items 320, 520 may be displayed prior to encountering the related content in the video source 302 502. For example, the menu items 320, 520 may be provided by an application 108 or other file such as, but not limited, an HTML file. The one or more menu items 320, 520 may also be displayed substantially simultaneously as, or after, encountering the related content in the video source 102.

The video display system 170 may further comprise a video source metadata input device 190. Although the input device 190 is shown as electronically coupled to the network device 150, it is also contemplated that the input device 190 may be electronically coupled to the video display device 100 or may be a portion of the video display device 100 or network device 150. One metadata input device 190 may comprise a computing device adapted to manually enter the metadata into the video source 102 through an application 108. The system 170 may further comprise a video selection mechanism such as, but not limited to, the user interface 106. Automated video selection mechanisms such as, but not limited to, applications 108 are also contemplated. In one embodiment, the video selection mechanism may provide a plurality of options for viewing one or more sections of the video source 102, with the video selection mechanism using the video source metadata in obtaining the one or more sections of the video source 102, and the video display device 100 displaying the one or more obtained sections of the video source 102.

In conclusion, embodiments of the present invention are related to providing and using time-based metadata in digital video files. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A video display device comprising:
a digital file comprising a video source and time based metadata, wherein the time-based metadata corresponds to one or more menu options, and each menu option corresponds to one or more objects, events, or persons present in a scene of the video source at one or more timestamps indicated by the time-based metadata; and
a video playback mechanism that identifies and displays at least a portion of the video source according to a first-selected one or more of the menu options, the video playback mechanism adapted, during playback of the at least a portion of the video source, to:
display each of the one or more menu options as its corresponding one or more objects, events, or persons is displayed;
receive a second selection of one of the displayed menu options; and
maintain and display a link in a follow-up list, the link adapted to provide additional information relating to a topic associated with the second-selected menu option.

2. The video display device of claim 1 wherein, the video playback mechanism,
comprises a user-interface comprising the one or more menu options; and
is adapted to provide an automated review of at least a portion of the time-based metadata.

3. The video display device of claim 2 wherein,
the one or more menu options comprises at least one or more first menu options; and further comprising,
one or more additional menu options corresponding to, at least a portion of the time-based metadata, and
the at least one or more first menu options.

4. The video display device of claim 3 wherein,
the one or more additional menu options comprise at least one first additional menu option and at least one second additional menu option; and
the at least one second additional menu option corresponds to at least one of the at least one first additional menu option and is adapted to display at least a portion of the video source.

5. The video display device of claim 3 wherein the display of at least a portion of the video source corresponds to,
the at least one or more first menu items; and
the one or more additional menu options.

6. The video display device of claim 1 wherein, the time-based metadata, comprises information related to the video source; and corresponds to a plurality of timestamps in the video source.

7. The video display device of claim 6 wherein the plurality of timestamps comprises:
a starting timestamp for one or more scenes including at least one of the one or more objects, the one or more events, or the one or more persons in the video source, and
an ending timestamp for one or more scenes including at least one the one or more objects, the one or more events, or the one or more persons in the video source.

8. The video display device of claim 1 wherein, the one or more menu items comprise one or more display restrictions.

9. The video display device of claim 8, wherein, the one or more display restrictions comprise age restrictions.

10. The video display device of claim 1 wherein, the one or more menu items are one of displayed and selected by choosing one of a person, event, and object in the video source.

11. A method of displaying at least a portion of one or more videos comprising:
identifying, in a digital file comprising a video source and time-based metadata, a set of one or more objects, one or more events, or one or more persons present in the video source at one or more timestamps indicated by the time-based metadata;
associating one or more menu option in a user interface with at least one of the set of objects, events, or persons;
reviewing the time-based metadata in response to a first selection of the one or more menu options;
displaying one or more sections of the video source comprising the associated at least one of the set of objects, events, or persons according to the time-based metadata; and
during playback of the one or more sections of the video source:
displaying each of the one or more menu options as its corresponding one or more objects, events, or persons is displayed;
receiving a second selection of one of the displayed menu options; and
maintaining and displaying a link in a follow-up list, the link adapted to provide additional information relating to a topic associated with the second-selected menu option.

12. The method of claim 11 wherein,
the reviewing comprises determining a starting timestamp and an ending timestamp for the one or more sections of the video source; and
the displaying comprises displaying one or more sections of the video source beginning at the starting timestamp for one of the one or more sections of the video source and ending at the ending timestamp for one of the one or more sections of the video source.

13. The method of claim 12 wherein,
the one or more menu options comprises a first list of the at least one of the one or more objects, one or more events, and one or more persons; and
further comprising,
selecting at least one of the one or more objects, one or more events, and
one or more persons from the first list of the at least one of the one or more objects, one or more events, and one or more persons prior to reviewing time-based metadata in the video source;
displaying a second list of at least one of the one or more objects, one or more events, and one or more persons, the second list corresponding to at least one of a selected one or more objects, one or events, and one or more persons prior to the displaying one or more sections of the video source; and
selecting an item from the second list of at least one of the one or more objects, one or more events, and one or more persons prior to the displaying one or more sections of the video source.

14. The method of claim 11 further comprising,
displaying the one or more sections of video source substantially simultaneously as reviewing time-based metadata in the video source; and
displaying one or more real-time menu options, wherein the one or more real-time menu options correspond to one or more objects, one or more events, or one or more persons being displayed in the one or more sections of the video.

15. The method of claim 14 further comprising,
choosing at least one of the one or more real-time menu options; and
saving the at least one of the one or more real-time menu options.

16. The method of claim 11,
further comprising, inputting the time-based metadata to the video source; and
wherein, reviewing time-based metadata in the video source comprises determining when the one or more objects are present in the video.

17. A video display system comprising:
a digital file comprising a video source and a plurality of time-based metadata, the plurality of time-based metadata corresponding to a set of content in the video source, each of the set of the content comprising at least one object, event, or person present in the video source at one or more timestamps indicated by the time-based metadata;
a network device adapted to provide at least a portion of the video source based on at least one starting timestamp of the time-based metadata, and ending timestamp of the time-based metadata; and
a video display device comprising a user interface, the user interface comprising one or more menu items, wherein:
each of the one or more menu items corresponds to one or more of the set of content,
the video display device is adapted to receive the at least a portion of the video source in response to receiving a first selection of one or more of the menu items, such that the starting timestamp and the ending timestamp corresponds to presence of the associated content in the video source,
the video display device is adapted to display the at least a portion of the video source, and
during playback of the at least a portion of the video source, video display device is adapted to:
display each of the one or more menu options as its corresponding one or more objects, events, or persons is displayed;
receive a second selection of one of the displayed menu options; and
maintain and display a link in a follow-up list, the link adapted to provide additional information relating to a topic associated with the second-selected menu option.

18. The video display system of claim 17 wherein the at least a portion of the video source comprises at least a portion of a plurality of video sources.

19. The video display system of claim 17 further comprising,
a video source metadata input device;
a video selection mechanism providing a plurality of options for viewing one or more sections of the video source, the video selection mechanism using the video source metadata in obtaining the one or more sections of the video source; and wherein,
the video display device displays the one or more sections of the video source.

20. The video system of claim 19 wherein,
the plurality of time-based metadata comprises information associated with the video source; and
the video source metadata input device provides,
manually input metadata, and
automatically input metadata.

21. The video system of claim 20 wherein, an object recognition device provides information to automatically input the metadata.

22. The video display system of claim 17 wherein,
the video source comprises a first video source;
further comprising a second video source; and wherein, the user interface is adapted to enable a user to create a compilation video comprising a portion of the first video source and the second video source.

23. The video display system of claim 22 wherein, the compilation video is displayed beginning at the starting timestamp for a first video section of the first video source and ending at the ending timestamp for a second video section of the second video source.

* * * * *

UNITED STATES PATENT AND TRADEMARK OFFICE
CERTIFICATE OF CORRECTION

Page 1 of 1

PATENT NO. : 10,491,968 B2
APPLICATION NO. : 13/283100
DATED : November 26, 2019
INVENTOR(S) : Mat Ryer and Phil Jackson It is certified that error appears in the above-identified patent and that said Letters Patent is hereby corrected as shown below:

On the Title Page

Under Item (56), References Cited, U.S. Patent Documents:
Please add --2010/0293190 A1* 11/2010 Kaiser et al.--.

Signed and Sealed this
Thirty-first Day of March, 2020

Andrei Iancu
*Director of the United States Patent and Trademark Office*